Figure 1:
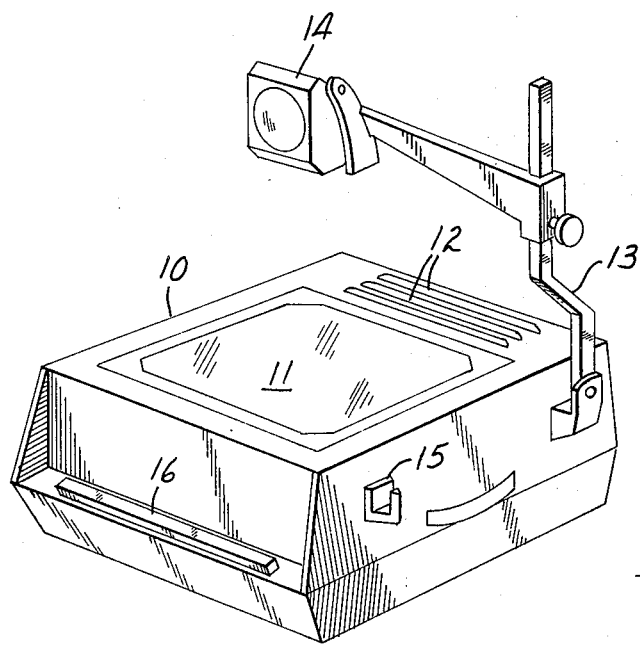

United States Patent [19]

Anderson et al.

[11] 3,979,160

[45] Sept. 7, 1976

[54] COMPACT OVERHEAD PROJECTOR

[75] Inventors: Raymond H. Anderson, St. Mary's Point; Ning Wu, St. Paul, both of Minn.

[73] Assignee: Minnesota Mining and Manufacturing Company, St. Paul, Minn.

[22] Filed: Mar. 3, 1975

[21] Appl. No.: 554,418

[52] U.S. Cl. .................................. 353/63; 353/122; 240/41.3; 240/93; 240/103 R; 353/98
[51] Int. Cl.² .................. G03B 21/08; F21V 13/04; F21V 7/00
[58] Field of Search ................. 353/122, 98, 63, 64; 240/41.35 R, 41.35 A, 41.35 B, 41.35 C, 41.35 D, 41.35 E, 41.35 F, 93, 92, 103 R, 103 B, 41 SC, 41 R, 41.37, 41.38 R, 41.38 A, 44, 103 R, 103 A, 103 B

[56] References Cited
UNITED STATES PATENTS

| 3,126,786 | 3/1964 | Appeldorn | 353/98 |
| 3,428,800 | 2/1969 | Levin et al. | 240/41.3 |
| 3,578,966 | 5/1971 | Levin | 240/93 |
| 3,707,626 | 12/1972 | Deichen | 240/103 R |
| 3,708,221 | 1/1973 | Schaefer | 350/189 |
| 3,711,194 | 1/1973 | Wilson, Jr. | 353/98 X |
| 3,744,892 | 7/1973 | Shipsey | 353/63 |
| 3,763,348 | 10/1973 | Costello | 240/103 R X |
| 3,768,900 | 10/1973 | McLintic | 240/103 R X |
| 3,806,236 | 4/1974 | Downing | 353/98 X |

Primary Examiner—Richard E. Aegerter
Assistant Examiner—Larry Jones
Attorney, Agent, or Firm—Alexander, Sell, Steldt & DeLaHunt

[57] ABSTRACT

A compact portable overhead projector providing improved uniformity and efficiency of illumination employs an off-focus light source within a truncated light-diffusing ellipsoidal reflector in conjunction with an off-focus aperture plate adjacent the open end of the reflector.

5 Claims, 3 Drawing Figures

COMPACT OVERHEAD PROJECTOR

This invention relates to overhead projectors and in a major aspect to compact portable overhead projectors of improved efficiency.

Typical prior art overhead projectors comprise a box-like case containing a light source beneath a Fresnel condensing lens and an adjacent stage for supporting a transparency, and a projection head adjustably mounted above the stage for directing and focusing the projected image. One such structure is described in U.S. Pat. No. 3,126,786. A large stage, usually 10 × 10 inches in dimensions, permits the projection of images from full letter size transparencies. A projection area of approximately 60 × 60 inches is commonly required. In order to obtain sufficient illumination for providing acceptable projection in a lighted classroom or lecture area, light sources used in such prior art projectors have commonly been rated in the neighborhood of at least 500 watts and in some cases upwards of 900 watts.

U.S. Pat. No. 3,428,800 describes a light source comprising a coiled filament mounted substantially at the enclosed focal point of a truncated ellipsoidal reflector having a diffusely reflective lightly peened or grooved surface. Improved uniformity of illumination is attained, but with loss of efficiency, by means of a central shield which obstructs the direct rays. Other prior art light sources, also employing truncated ellipsoidal reflectors, are shown in U.S. Pat. Nos. 3,578,966 and 3,708,221 as including a filament and an aperture plate located at the inner and outer focal points respectively of the ellipsoid. Such sources project an intense but relatively narrow cone of light, suitable for use in vehicular headlights and in cinematographic projectors but inadequate for enclosure within a compact overhead projector having the desired large area stage.

The overhead projector of the present invention employs a truncated, diffusely reflective, ellipsoidal reflector and an aperture plate, but omits the central shield and in addition offsets the aperture plate from the outer focal point. As a result, the efficiency of the illumination system is improved to the extent that the power requirements are significantly reduced; the customarily required output of 2000 lumens is obtained with a 350 watt source. Also, surprisingly, the uniformity of illumination is increased, so that image components at the corner areas remain fully legible without requiring any reduction of normal ambient illumination. In addition, these improvements in the light source reduce the cooling requirements and in other ways aid in reducing the dimensional requirements, thereby making possible a compact portable overhead projector which is convenient to transport via airplanes and other public conveyances, yet is capable of accepting full letter size transparencies for overhead projection.

Figure 3:
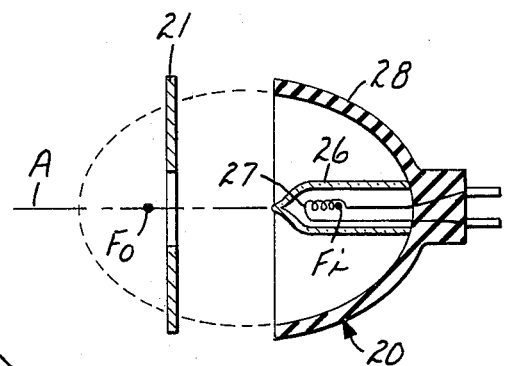
Figure 2:
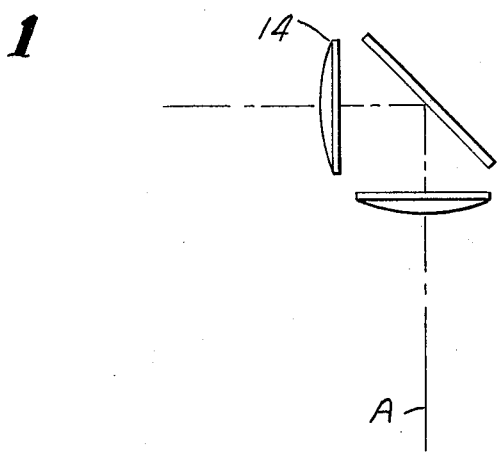
Figure 2:
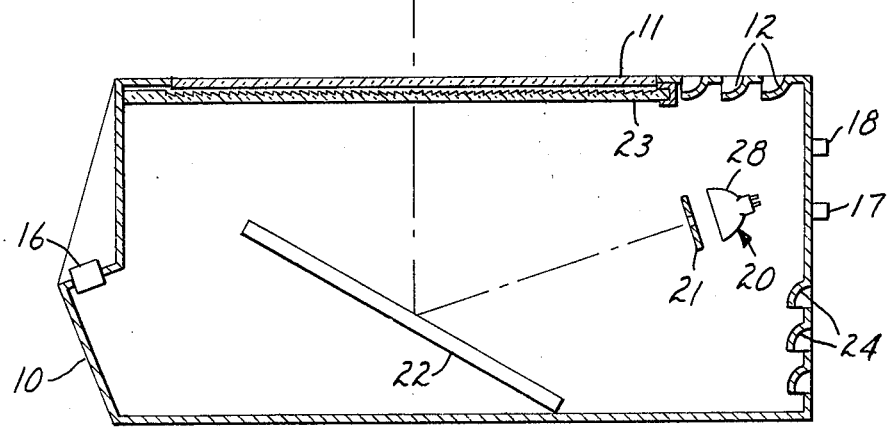

In the drawing,

FIG. 1 is a view in perspective of a portable overhead projector embodying the invention, in position for operation, FIG. 2 illustrates schematically the preferred positioning of the essential components of the overhead projector, and FIG. 3 is a detail view illustrating the relationship of the light source, reflector and aperture plate.

The projector is shown in FIG. 1 to include a box-like case 10 having at the upper surface a transparent stage 11 and louvers 12. A side wall supports a foldable bracket 13 carrying an adjustable projection head 14, shown in upright operating position, as well as a retaining bracket 15 for holding the assembly when folded to carrying position.

As shown in FIG. 2, the case 10 contains a light source 20, aperture plate 21, plane mirror 22 and Fresnel condensing lens 23. Louvers 24 admit influx of cooling air which, powered by a fan (not shown), exits through top louvers 12. Operation of the projector is controlled by means of a switch plate 16, and lamp adjustment by levers 17 and 18. During operation, light from the source 20 is directed through the aperture plate 21 to the mirror 22 and thence through the lens 23 and stage 11 on which a transparency is to be laid. The light then passes to the projection head 14 and is directed to, and focused on, a wall or view screen (not shown).

The folded beam makes possible a reduction in the depth of the assembly, resulting in a compact structure which can be conveniently hand carried, fits within the space available beneath the seats of airplanes, and needs no expansion or manipulation other than raising of the projection head assembly prior to use.

The structure and arrangement of the source 20 and plate 21 is shown in more detail in FIG. 3. A lamp 26 contains a coiled filament 27 which is located as symmetrically as possible about the optical axis A and, as shown in the Figure, mainly to the left of the inner focal point $F_i$ of the truncated ellipsoidal reflector 28. The reflective inner surface of the reflector is made diffusely reflective, e.g., by gentle peening if of metal. Preferably, the reflector is of lightly silvered glass or plastic which, while being highly opaque to and reflective of visible light, is at least partially transmissive of infra-red heat-producing rays, so as to minimize the possiblity of overheating within the source 20.

The outer focal point of the ellipsoidal reflector is indicated at $F_o$ within the broken line structure representing the missing portion of the ellipsoid. The position of the aperture plate 21 does not, however, coincide with the location of the focus $F_o$. Instead, it is offset toward the inner focal point and to a location at which the light from the source 20 appears as a high intensity disc of minimum area on an appropriate flat target. The desired location may alternatively be determined by measuring the total illumination received at the view screen for various positions of the aperture plate and plotting the position at which the illumination would be a maximum.

The aperture plate may be in the form of an adjustable stop wherewith the area of the axially centered opening may be altered as desired. The aperture will usually be circular, although square or other shapes may be substituted if desired. Reducing the area to a diameter less than the minimum diameter of the light beam reduces the total amount of light reaching the screen, but surprisingly results in improved uniformity of illumination as well as improved resolution. It is found desirable in practice to limit the size of the aperture to not more than about 90% of the area of minimum diameter of the high intensity beam.

Once an aperture area suitable for a specific projector design and application has been determined, a plate having a fixed area aperture is entirely suitable and provides a simplified structure.

An illustrative specific Example of an overhead projector embodying the principles of this invention employs a projection head and Fresnel condensing lens substantially as described in U.S. Pat. No. 3,126,786, in conjunction with a plane mirror, light source and aperture plate as described and illustrated herein. The reflector has a peened or dimpled metallic diffusely reflecting surface and is 1.75 inches across the open end. The outer focal point is approximately one inch from the plane of the open end of the reflector. The aperture plate is located 0.75 inch from the open end of the reflector and the aperture is circular and of 0.922 inch diameter, whereas the minimum observed diameter of the disc of high intensity light observed on a target similarly positioned is estimated as 1.1 inches. The total length of the axial light path from aperture plate to Fresnel lens is 10.98 inches. The lamp 16 is rated at 350 watts. The stage area is 10 × 10 inches. With the projection head lowered, the overall height of the device is but eight inches.

Light from the projector is focused on a viewing screen at a distance sufficient to illuminate an area of 60 × 60 inches. The area is divided into nine equal portions and intensity of illumination is measured at the center of each. The ratio of the average illumination received at the corner areas to that at the central area is 44/100.

A standard transparency containing a resolution pattern of variously spaced lines is placed on the stage and the projected pattern is inspected visually. Under conditions which permit resolution of 16 lines/mm. at the central area, the average resolution for the outer areas is 11¼ lines/mm.

For comparison, similar measurements are made using circular apertures of other diameters, with results as tabulated below. (The values obtained at an aperture of 0.922 inch are included for ease of comparison.)

| Aperture diam. inches | Illumination, lumens Total | Corner/Center | Resolution lines/mm. |
|---|---|---|---|
| 1.31 | 2223 | .39 | 8.8 |
| 1.20 | 2207 | .39 | 9.3 |
| 1.10 | 2157 | (.38) | 10.3 |
| .994 | 1974 | .43 | 10.6 |
| .922 | 1847 | .44 | 11.3 |
| .850 | 1703 | .48 | 11.3 |

What is claimed as new is as follows:

1. A compact overhead projector having aligned along an optical axis, in order, a light source, an aperture plate, a plane mirror, a Fresnel condensing lens, a stage, and a projection head, the latter being adapted to direct and focus onto a remote screen an image of graphic information contained on a transparency laid on the stage, and wherein said light source includes a truncated light-diffusing ellipsoidal reflector having an inner and an outer focal point and an axially disposed incandescent filament offset from said inner focal point toward said outer focal point, said source generating a light pattern having a minimum-diameter high-intensity area, said aperture plate being disposed perpendicularly to said optical axis at a point offset from said outer focal point toward said inner focal point and at the point along said optical axis of said minimum-diameter high-intensity light area, the aperture being of lesser diameter than said high-intensity minimum-diameter area.

2. Overhead projector of claim 1 wherein said outer focal point is located about one inch from the open end of said reflector and said aperture plate is located about three-fourths inch from said open end.

3. Overhead projector of claim 2 wherein said minimum diameter high intensity area has a diameter of about 1.1 inches and said aperture has a diameter of not more than about 1.0 inch and not less than about 0.9 inch.

4. Overhead projector of claim 3 wherein the diameter of said aperture is about 0.92 inch.

5. A compact overhead projector having a light source, an aperture plate, a fresnel condensing lens, a stage, and a projection head aligned in order along an optical axis, the projection head being adapted to direct and focus onto a remote screen an image of graphic information contained on a transparency laid on the stage, said light source comprising a truncated light-diffusing ellipsoidal reflector having an inner and an outer focal point and an axially disposed incandescent filament offset from said inner focal point toward said outer focal point, said source generating a light pattern having a minimum-diameter high-intensity area, said aperature plate being disposed perpendicularly to said optical axis at a point offset from said outer focal point toward said inner focal point and at the point along said optical axis of said minimum-diameter high-intensity light area, and the area of the aperture being not more than about 90 percent of the area of said high-intensity minimum-diameter area.

* * * * *